US005499407A

United States Patent [19]

Atwell et al.

[11] Patent Number: 5,499,407

[45] Date of Patent: Mar. 19, 1996

[54] SPACE-SAVING BEDDING SYSTEM DISPLAY DEVICE

[75] Inventors: Michael J. Atwell, Medina; Thomas J. O'Donnell, Westlake, both of Ohio

[73] Assignee: Ohio Mattress Company Licensing and Components Group, Cleveland, Ohio

[21] Appl. No.: 227,066

[22] Filed: Apr. 13, 1994

[51] Int. Cl.[6] .................................................. C09F 19/00

[52] U.S. Cl. ......................... 5/1; 5/503.1; 5/658; 60/538; 60/606

[58] Field of Search ................................ 5/1, 503.1, 658, 5/512, 513, 907, 287, 53.1; 211/28; 40/538, 606, 612

[56] References Cited

U.S. PATENT DOCUMENTS

| | | | |
|---|---|---|---|
| 1,716,862 | 6/1929 | McEntire | 211/28 |
| 2,154,622 | 4/1939 | Jones | 211/28 |
| 2,253,764 | 8/1941 | Condon | 211/28 |
| 2,559,106 | 7/1951 | Bishop et al. | 40/606 |
| 3,266,063 | 8/1966 | Shapiro | 40/538 X |
| 3,736,603 | 6/1973 | Rothman | 5/53.1 |
| 4,642,946 | 2/1987 | Koch | 40/606 X |
| 4,765,006 | 8/1988 | Jackson et al. | 5/907 X |
| 5,083,390 | 1/1992 | Edman | 40/606 |

OTHER PUBLICATIONS

Waterbed Magazine/Feb. 1989, advertisement for "Bed Wrapper".

*Primary Examiner*—Michael F. Trettel
*Attorney, Agent, or Firm*—Calfee Halter & Griswold

[57] ABSTRACT

A display device for illustrating the internal construction of a conventional bedding system displayed on the sales floor of a store is adapted to be superposed on a corner of the displayed bedding system. The novel display device comprises three generally-planar members, one planar member corresponding with the horizontally-disposed body-receiving surface of the mattress and the other two generally-planar members corresponding to the two side surfaces of the bedding system forming the corner on which the display device is superposed. On each of the three generally-planar members of the device is a different picture, each picture portraying the likeness of the individual components of the innerspring assembly of the mattress on which the display device is superposed in such a way that these likeness simulate in two dimensions the structures and arrangement of the corresponding components in the innerspring assembly of the mattress. The overall effect, then, is to provide a visual representation of the internal structure of the bedding system on which the invention display device is superposed in substantial registration with the corresponding components in the actual mattress and foundation displayed.

16 Claims, 2 Drawing Sheets

SPACE-SAVING BEDDING SYSTEM DISPLAY DEVICE

BACKGROUND OF THE INVENTION

The present invention relates to a display device for use in displaying and advertising the features, particularly the internal construction, of bedding systems such as those composed of innerspring mattresses and "foundations," also known as "boxsprings."

In order to promote the sale of bedding systems at point-of-sale locations, bedding stores typically display a variety of different sample mattress/foundation systems on the sales floor of the store. Also, to educate potential customers about the features of individual bedding systems, advertising literature is normally provided. In addition, some bedding manufacturers also provide "cutaway" displays which illustrate the interior construction of their mattresses and/or foundations. Such cut-away displays typically take the form of a small section of a mattress having some or all of the padding and ticking layers cut away so that the interior construction of the innerspring assembly and one or more of the padding layers can be seen. To keep the display together, a transparent flexible plastic covering layer is also normally provided.

Although such sample mattresses, literature and displays are helpful, they do not provide a full display and illustration of all of the features which make particular bedding systems unique. For example, cut-away sections taken from the interior of mattresses or foundations usually do not include the periphery of the mattress or foundation, which can have a significant impact on the overall performance of the bedding system. In addition, written literature, although capable of illustrating all features, does not do so in a three dimensional way. Therefore, it is oftentimes difficult for the customer to visualize how these features are fully integrated into the bedding system and thereby contribute to its improved performance.

Another factor which is important in connection with point-of-sale sales promotion of bedding systems is floor space. Sample mattresses take up a lot of floor space, so that floor space is always at a premium. Therefore, any point-of-sale bedding system display device should not be so large that it preempts the display of additional mattresses.

Accordingly, it is an object of the present invention to provide a new display device for displaying bedding systems, primarily for use at point-of-sale locations, which is capable of providing a fully integrated, realistic, three-dimensional display of all the unique features of a particular bedding system while at the same time taking up a minimal amount of floor space.

SUMMARY OF INVENTION

This and other objects are accomplished by the present invention which provides a display device adapted to be superposed on a corner of a conventional bedding system already displayed on the sales floor of a store (hereinafter "host" bedding system). The novel display device comprises three generally-planar members, one planar member corresponding with the horizontally-disposed body-receiving surface of the host mattress and the other two generally-planar members corresponding to the two side surfaces of the host bedding system forming the corner on which the display device is superposed. On each of the three generally-planar members of the device is a different picture, each picture portraying the likenesses of the individual components of the innerspring assembly of the host mattress on which the display device is superposed in such a way that these likenesses simulate in two dimensions the structures and arrangement of the corresponding components of the host mattress. The overall effect, then, is to provide a visual representation of the internal structure of the host bedding system which itself is life-like in appearance and also which is arranged in substantial registration with the corresponding components of the host bedding system. The overall effect of these features is to provide a three-dimensional simulation of the interior structure of the host bedding system with two-dimensional illustrations, especially when viewed from the vantage point located facing the corner of the bedding system on which the inventive display device is superposed.

Being of simple and lightweight construction, the inventive display assembly takes up little space when superposed in position on a host bedding system. Moreover, it can be easily moved to a corner or other out-of-the-way location on the sales floor of the store, and even in a non-superposed position can provide a high impact display of the internal structure of the bedding system being illustrated.

BRIEF DESCRIPTION OF DRAWINGS

The present invention is more thoroughly illustrated in the drawings wherein.

DETAILED DESCRIPTION

Figure 1:
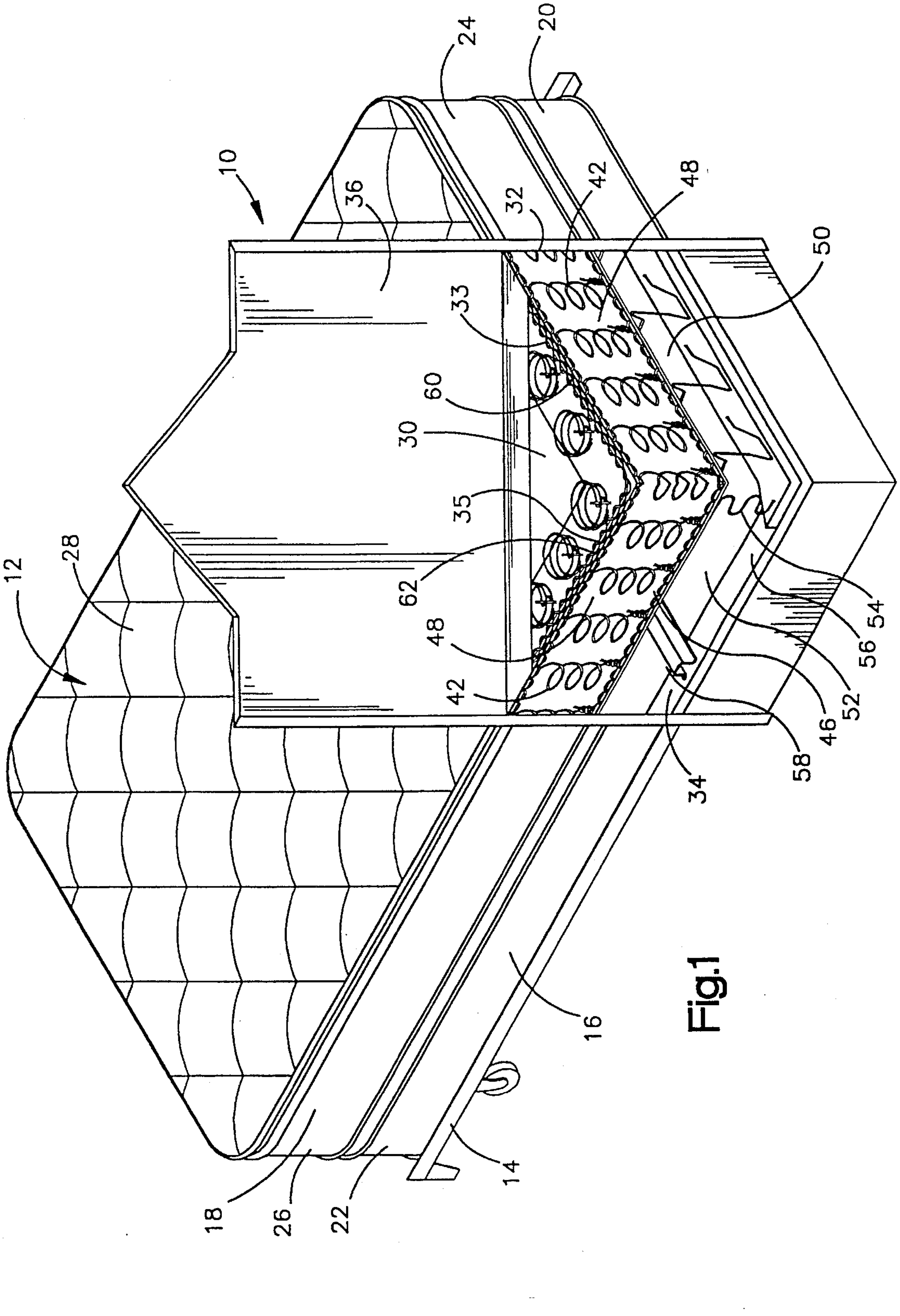
FIG. 1 is an isometric view illustrating the inventive display device in superposed position with a bedding system whose internal construction is to be displayed.
Figure 2:
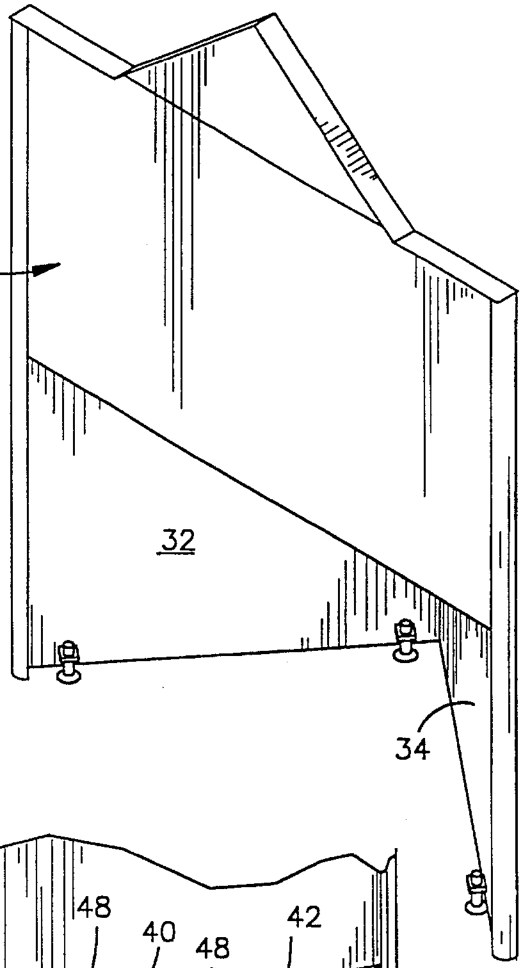
FIG. 2 is an isometric view similar to FIG. 1 showing the other side of the inventive display device from the side shown in FIG. 1.

The inventive display device provided by the present invention, generally indicated at 10, is shown in FIG. 1 superposed on the corner of a host bedding system generally indicated at 12. Host bedding system 12 is carried on a conventional bed stand 14 and is composed of a foundation 16 and a mattress 18.

As shown in FIG. 1, the bedding system is arranged in an in-use configuration with the mattress being arranged on top of the foundation in a generally horizontal position.

Foundation 16 of bedding system 12 defines two vertically-oriented side surfaces 20 and 22 and a generally horizontal top surface (not shown). In the same way, innerspring mattress 18 defines a number of generally-vertical side surfaces, side surfaces 24 and 26 being shown in the figure, as well as a body-receiving surface 28. In the embodiment shown, bedding system 12 has a typical construction and configuration of the type exhibited by many bedding systems sold today. In particular, bedding system 12 is essentially in the form of a rectangular box with the planes forming the various top, bottom and side surfaces of the mattress and foundation being arranged orthagonally with respect to one another. In addition, both the foundation and the mattress have respective interior constructions which are each covered with one or more layers of opaque material so that these internal constructions cannot be seen.

In the particular embodiment shown, the interior assembly of the foundation is composed of a support system of steel springs, wood and steel beams and is covered on its top by a thin fibrous padding layer and is also enclosed completely with an opaque layer of ticking. In the same way, the mattress in the embodiment shown is composed of an innerspring assembly, multiple layers of padding over the body-receiving surface of the innerspring assembly and an opaque layer of ticking completely enclosing all surfaces of the mattress.

Because practically all materials used for ticking and padding in the construction of conventional bedding systems are opaque, it is not possible to see the interior construction of either the mattress or the foundation of a typical bedding system such as displayed on the sales floor of a bedding store. To remedy this problem, the present invention provides the inventive display device 10.

As shown in FIG. 1, inventive display device 10 comprises a first generally planar member 30 corresponding to body receiving surface 28 of bedding system 12, a second generally planar member 32 corresponding to the side surfaces 20, 24 of the bedding system and a third generally planar member 34 corresponding to the side surfaces 22, 26 of the bedding system. Like the planes defining side surfaces 20, 24, side surfaces 22, 26 and body receiving surface 28 of the bedding system, the planes defining the first, second and third generally planar members 30, 32 and 34 of the inventive display system 10 are also arranged orthagonally and in this configuration are substantially congruent with the corresponding body receiving and side surfaces of the bedding system when the display assembly is superposed on the corner of the bedding system as shown in the figure. Also, in this configuration, first generally planar member 30 intersects and is attached to second generally planar member 32 at a linear corner 33 and also to third generally planar member 34 at linear corner 35.

In the preferred embodiment of the invention as illustrated in the figures, second generally planar member 32 and third generally planar member 34 have essentially the same width so that first generally planar member 30 is in the form of an isosceles triangle. In addition, first generally planar member 30 is arranged horizontally so that it is above and generally parallel to the body-receiving surface 28 of mattress 18. Also, the second and third planar surfaces are spaced equidistant from the respective side surfaces, and preferably touch the respective side surfaces, of the bedding system when the display device is in superposed relation as shown.

It is also preferred that the device be designed so that first generally planar member 30 will lie adjacent and above body-receiving surface 28 of mattress 18 by a distance no greater than two-thirds of the thickness of the mattress when the device is in superposed relation on the host bedding system. More preferably, first generally planar member 30 is arranged as close as possible to body-receiving surface 28 of the bedding system so as to be able to simulate as closely as possible a realistic representation of the interior construction of the mattress and foundation as discussed below.

In accordance with another feature of the invention, a fourth generally planar member 36 can be included in the inventive display device to provide a base or foundation on which advertising information can be written or advertising brochures secured and so forth. Also, if desired, casters or other suitable devices for facilitating movement of the display device 10 into and out of position with bedding system 12 can also be provided.

In accordance with the present invention each of the first, second and third generally planar members of the inventive device 10 is provided with a picture which illustrates the internal construction of mattress 18 and optimally foundation 16 of the host bedding system 12.

For example, the innerspring assembly of host mattress 18 is composed of a series of innersprings, terminal wires and helical windings arranged to secure the innersprings and terminal wires in place. An edge-supporting member comprising a substantially rigid foam material is also provided adjacent the terminal innersprings of the assembly to improve the firmness of the mattress at its periphery. In accordance with the invention, each of these components is shown in a first picture 38 located on first generally planar member 30 in such a way that the likenesses of these individual components simulate in two dimensions the structure and arrangement of the corresponding real components of host mattress 18.

Figure 3:
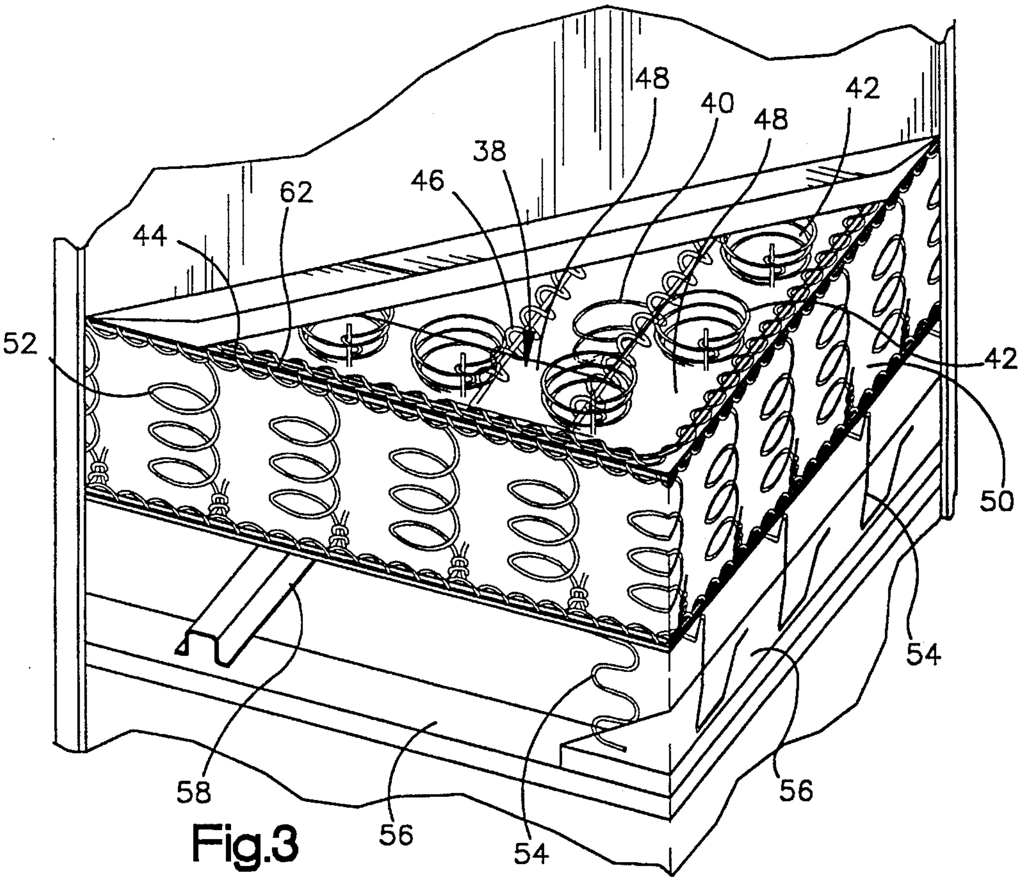
FIG. 3 is another isometric view of the inventive display device of FIG. 1 showing in particular the likenesses of the individual components of the internal structure of the display bedding system as portrayed in two of the three pictures forming a part of the inventive display device of the present invention.

In particular, first picture 38, as illustrated in FIG. 3, is an artist's rendition, in perspective view, showing what the individual components of the innerspring assembly of host mattress 18 would look like if the opaque ticking and padding layers of the mattress were removed. Thus, first picture 38 illustrates interior convolutions 40, terminal convolutions 42, terminal wires 44, helical windings 46 and edge-reinforcing members 48 of the internal construction of mattress 18. Because picture 38 is essentially a perspective view taken from a perspective above and to the side of the internal construction of mattress 18 with the opaque ticking and padding layers removed, the likenesses of the individual components of the internal structure, i.e. the various spring convolutions, terminal wires, windings and so forth, simulate the structure and arrangement of the actual corresponding components of host mattress 18. This enables the viewer, when facing the corner of the bedding system in such a way that picture 38 can be seen, to obtain a simulated, lifelike view of the internal structure of the host mattress.

In the same way, second generally planar member 32 and third generally planar member 34 are provided with second and third pictures 50 and 52, respectively. Like first picture 38, second and third pictures 50 and 52 are also artist's renditions, in perspective view, of the internal construction of the internal construction of mattress 18. Being views of the side of the bedding system, however, second picture 50 and third picture 52 illustrate the internal components of the mattress 18 from a side view perspective rather than a top view prospective. In particular, as can be seen in both FIGS. 1 and 3, second picture 50 and third picture 52 show only the visual portion of the structure of the internal construction of host mattress 18 which would be visible from viewing the sides of host mattress 18 with the ticking and other layers covering the internal construction thereof removed. For example, while second picture 50 and third picture 52 illustrate the terminal convolutions 42, the terminal wires 44, the helical windings 46 and the edge-reinforcing members 48 of the mattress, they do not illustrate the interior convolutions 40 of the innerspring assembly. These would be visible if viewing an actual innerspring assembly only from the top, and therefore they are illustrated in the inventive display device only in the top view of first picture 38.

In accordance with the present invention, as described above, pictures are used to display the internal structure of bedding system 12. Any type of picture can be employed for this purpose, for example artist's renditions or photographs, and various different types of views are possible. It is desirable, however, to make the pictures as lifelike as possible in terms of the simulation of the actual appearance and arrangement of the internal components of the bedding system and to this end perspective views as described are preferable. From FIGS. 1 and 3, it can be seen that the perspective views in the illustrated embodiment appear to be taken from essentially the same location, this location being above and to the side of the mattress innerspring assembly, (i.e. above first generally planar member 30) and to the side (i.e. in front of) of second and third generally-planar members 32 and 34.

In other words, the three planes defining first, second and third generally planar members 30, 32 and 34 intersect at a point (the top of the isosceles triangle formed by first generally planar member 30) and divide the space surrounding this point into eight different sectors. In the most preferred embodiment of the invention, the perspective views in first picture 38, second picture 50 and third picture 52 are all taken from the sector opposite the sector containing bed system 12 with respect to this point, most preferably from the same location in this sector. When viewed from this sector, all three of pictures 38, 50 and 52 of the inventive display device can be seen at the same time. Accordingly, the inventive display device will provide the most lifelike simulation of the interior of the host bedding system, especially when viewed from the sector, if pictures 30, 50 and 52 are all taken from this same sector, especially if taken from the same location in this sector. Incidentally, for this purposes of this disclosure, a location which "faces" the inventive display device when superposed on the host bedding system will be regarded as being in this same sector.

Display device 10 is also preferably constructed and arranged so that first picture 38 intersects second picture 50 at linear corner 33 and further so that first picture 38 intersects third picture 52 at linear corner 35. In addition, display device 10 is also preferably constructed and arranged so that the likenesses of the components of the innerspring assembly as illustrated in second picture 50 and third picture 52 are in substantial vertical registration with the corresponding components in the mattress innerspring assembly of mattress 18. By "substantial vertical registration" is meant that in these pictures, the top of the illustrated innerspring assembly (e.g. the tops of terminal convolutions 42, helical windings 46 and the tops of terminal wires 44 as illustrated in second picture 50 and third picture 52) are above or below the body receiving surface 28 of mattress 18 by a distance no greater than two-thirds of the thickness of mattress 18 and, at the same time, the bottom of the illustrated innerspring assembly in pictures 50 and 52 is above or below the bottom plane (not shown) of mattress 18 by a distance also no greater than two-thirds the thickness of mattress 18. By having first picture 38 intersect second picture 50 and third picture 52 and also by keeping the likenesses of the components in second picture 50 and third picture 52 in substantial vertical registration with the corresponding components in the mattress innerspring assembly, the overall visual impression created is as lifelike as possible.

Finally, in a particularly preferred embodiment, the internal structure of foundation 16 can also be illustrated in second picture 50 and third picture 52. This is illustrated in FIGS. 1 and 3 in which the second and third pictures illustrate support springs 54, wooden support member 56 and steel support member 58 of foundation 16.

Also, in an especially preferred embodiment, the illustrations in the first, second and third pictures are made so that the likeness of the components in each of these pictures has substantially the same size and shape as the corresponding components of the innerspring assembly in the mattress so that the likenesses of these components in these pictures will be in substantial registration with the actual corresponding components in the mattress innerspring assembly.

Although only a single embodiment of the present invention has been illustrated above, many modifications can be made without departing from the spirit and scope of the invention. All such modifications are intended to be included within the scope of the present invention, which is to be limited only by the following claims.

We claim:

1. A display device for displaying the internal construction of a bedding system, said bedding system being arranged in a generally-horizontal, in-use configuration, said bedding system comprising a foundation and an innerspring mattress arranged on top of said foundation, said foundation comprising an interior assembly and an opaque covering thereon, said innerspring mattress comprising an innerspring assembly defining a body-receiving surface and at least one side surface, said innerspring mattress having an opaque covering on said body-receiving surface and said side surface, said display device comprising a first generally-planar member corresponding to the body-receiving surface of said mattress and a second generally-planar member corresponding to a side surface of said mattress, said first generally-planar member bearing a first picture of the innerspring assembly of said innerspring mattress such that the likenesses of the individual components of the innerspring assembly in said first picture are so portrayed that they simulate in two dimensions the structure and arrangement of the corresponding components of the innerspring assembly of said mattress when viewed from above said mattress innerspring assembly, said second generally-planar member bearing a second picture of the innerspring assembly of said innerspring mattress such that the likenesses of the individual components of said innerspring assembly in said second picture are so portrayed that they simulate in two dimensions the structure and arrangement of the corresponding components in the innerspring assembly of said mattress when viewed from the side of said mattress innerspring assembly.

2. The display device of claim 1 wherein, said first and second generally-planar members are arranged so that when said second generally-planar member is positioned adjacent and substantially parallel to the corresponding side surface of said mattress, said first generally-planar member will be above and substantially parallel to the body-receiving surface of said innerspring mattress and the likeness of the components of the innerspring assembly in said second picture will be in substantial vertical registration with the corresponding components in the mattress innerspring assembly.

3. The display device of claim 1 wherein said first and second generally-planar members and said first and second pictures intersect at a common linear corner.

4. The display device of claim 1 wherein the likenesses of the individual components of the innerspring assemblies in both said first and second pictures simulate the structure and arrangement of the corresponding components in the innerspring assembly of said mattress when viewed from the same location, said same location being above and to the side of said mattress innerspring assembly.

5. The display device of claim 3 wherein said bedding system defines multiple side surfaces, said display device further including a third generally-planar member, said third generally-planar member being arranged so that when said second generally-planar member is positioned adjacent and parallel to one side surface of said bedding system, said third generally-planar member will be positioned adjacent and parallel to another side surface of said bedding system, said third generally-planar member bearing a third picture of the innerspring assembly of said innerspring mattress such that the likenesses of the individual components of said innerspring assemblies in said first, second and third pictures are so portrayed that each simulates in two dimensions the structure and arrangement of the corresponding components in the innerspring assembly of said mattress when viewed from a location facing said display device.

6. The display device of claim 5 wherein the first, second and third generally-planar members of said display device are congruent with the body-receiving surface, a first side surface and a second side surface, respectively, of said bedding system.

7. The display device of claim 6 wherein said first and second side surfaces and the body-receiving surface of said bedding system are orthagonally arranged with respect to one another, the first, second and third generally-planar members of said display device also being orthagonally arranged with respect to one another.

8. The display device of claim 7 wherein said first, second and third generally-planar members are sized and arranged so that said display device can be moved into superposed relationship with said bedding system, said second and third generally-planar members of said display device being spaced essentially equidistant from respective side surfaces of said bedding system and said first generally-planar member of said display device being spaced above the body-receiving surface of said bedding system by no more than two-thirds of the thickness of said mattress when said display system is in said superposed relationship.

9. The display device of claim 8 wherein said second and third generally-planar members touch their respective side surfaces of said bedding system when said display device is in said superposed relationship.

10. The display device of claim 9 wherein the likenesses of the components in each of said pictures are substantially the same size and shape as the corresponding components of the innerspring assembly of said mattress when viewed from the same location above and to the side of said mattress innerspring assembly so that the likenesses of the components in said pictures will be in substantial registration with the corresponding components of said mattress innerspring assembly when said display device is in superposed relation with respect to said bedding system.

11. The display device of claim 10 wherein said second and third pictures include likenesses of the components of the interior assembly of said foundation arranged to show the position of these components in actual use.

12. The display device of claim 11 further comprising a generally-vertical fourth generally-planar member arranged above said first generally-planar member, the plane of said fourth generally-planar member intersecting the planes of said second and third generally-planar members at acute angles.

13. The display device of claim 1 wherein said first and second generally-planar members are sized and arranged so that said display device can be moved into superposed relationship with said bedding system.

14. The display device of claim 13 wherein said second picture includes likenesses of the components of the interior assembly of said foundation arranged to show the position of these components in actual use.

15. A display combination for displaying the internal construction of a bedding system, said combination comprising a bedding system and a display device, said bedding system being arranged in a generally-horizontal, in-use configuration and comprising a foundation and an innerspring mattress arranged on top of said foundation, said foundation comprising an interior assembly and an opaque covering thereon, said innerspring mattress comprising an innerspring assembly defining a body-receiving surface and at least one side surface, said innerspring mattress having an opaque covering on said body-receiving surface and said side surface, said display device comprising a first generally-planar member corresponding to the body-receiving surface of said mattress and a second generally-planar member corresponding to a side surface of said mattress, said first generally-planar member bearing a first picture of the innerspring assembly of said innerspring mattress such that the likeness of the individual components of the innerspring assembly in said first picture are so portrayed that they simulate in two dimensions the structure and position of the corresponding components of the innerspring assembly of said mattress when viewed from above said mattress innerspring assembly, said second generally-planar member bearing a second picture of the innerspring assembly of said innerspring mattress such that the likeness of the individual components of said innerspring assembly in said second picture are so portrayed that they simulate in two dimensions the structure and position of the corresponding components of the innerspring assembly of said mattress when viewed from the side of said mattress innerspring assembly, said first and second generally-planar members being arranged congruent to the body-receiving and the side surfaces of said mattress, respectively, said display device being superposed on said bedding system so that said first generally-planar member is above and substantially parallel to the body-receiving surface of said innerspring mattress and the second generally-planar member of said display device is adjacent and substantially parallel to the side surface of said innerspring assembly.

16. The combination of claim 15 wherein said first generally-planar member is spaced above the body-receiving surface of said bedding system by no more than two-thirds of the thickness of said mattress.

* * * * *